(12) United States Patent
Franzen, Jr. et al.

(10) Patent No.: US 11,117,329 B2
(45) Date of Patent: Sep. 14, 2021

(54) ADDITIVELY MANUFACTURED BUILD ASSEMBLIES HAVING REDUCED DISTORTION AND RESIDUAL STRESS

(71) Applicant: General Electric Company, Schenectady, NY (US)

(72) Inventors: Joseph Daniel Franzen, Jr., West Chester, OH (US); Jerod Curtis Kruse, Fort Worth, TX (US); Adegboyega Masud Makinde, Austin, TX (US)

(73) Assignee: General Electric Company, Schenectady, NY (US)

( * ) Notice: Subject to any disclaimer, the term of this patent is extended or adjusted under 35 U.S.C. 154(b) by 349 days.

(21) Appl. No.: 16/018,416

(22) Filed: Jun. 26, 2018

(65) Prior Publication Data

US 2019/0389138 A1 Dec. 26, 2019

(51) Int. Cl.
| | |
|---|---|
| *B29C 64/40* | (2017.01) |
| *B29C 64/153* | (2017.01) |
| *B22F 10/20* | (2021.01) |
| B33Y 10/00 | (2015.01) |
| B33Y 30/00 | (2015.01) |
| B33Y 40/00 | (2020.01) |
| B22F 10/30 | (2021.01) |

(52) U.S. Cl.
CPC .............. *B29C 64/40* (2017.08); *B22F 10/20* (2021.01); *B29C 64/153* (2017.08); *B22F 10/30* (2021.01); *B33Y 10/00* (2014.12); *B33Y 30/00* (2014.12); *B33Y 40/00* (2014.12)

(58) Field of Classification Search
CPC ..... B29C 64/171; B29C 64/176; B29C 64/40; B22F 2003/1058
See application file for complete search history.

(56) References Cited

U.S. PATENT DOCUMENTS

| | | |
|---|---|---|
| 699,533 A | 5/1902 | Jones |
| 738,921 A | 9/1903 | Lawson |
| 4,863,538 A | 9/1989 | Deckard |
| 5,460,758 A | 10/1995 | Langer et al. |

(Continued)

FOREIGN PATENT DOCUMENTS

| | | |
|---|---|---|
| DE | 102012011217 A1 | 12/2013 |
| DE | 102015104676 A1 | 10/2015 |

(Continued)

OTHER PUBLICATIONS

U.S. Appl. No. 15/702,040, filed Sep. 12, 2017.

(Continued)

*Primary Examiner* — Timothy Kennedy
(74) *Attorney, Agent, or Firm* — Dinsmore & Shohl LLP

(57) ABSTRACT

A build assembly and a method of manufacturing the same are provided. The build assembly includes a first component, a second component, and a support structure coupling the two components together to fix their relative position. The support structure may be a "ghost" structure that is not connected with or does not contact the components, but is positioned such that the components are restrained to prevent distortion. The support structure may also be connected to the components and may define channels for removing additive powder from within or around the components.

16 Claims, 8 Drawing Sheets

(56) References Cited

U.S. PATENT DOCUMENTS

| | | | |
|---|---|---|---|
| 5,529,471 A | 6/1996 | Khoshevis | |
| 5,545,367 A | 8/1996 | Bae et al. | |
| 5,595,703 A | 1/1997 | Swaelens et al. | |
| 5,656,230 A | 8/1997 | Khoshevis | |
| 5,837,960 A | 11/1998 | Lewis et al. | |
| 5,897,825 A | 4/1999 | Fruth et al. | |
| 6,042,774 A | 3/2000 | Wilkening et al. | |
| 6,391,251 B1* | 5/2002 | Keicher | B29C 64/153 419/7 |
| 6,471,800 B2 | 10/2002 | Jang et al. | |
| 6,995,334 B1 | 2/2006 | Kovacevic et al. | |
| 7,381,921 B2 | 6/2008 | Hagemeister et al. | |
| 7,435,072 B2 | 10/2008 | Collins et al. | |
| 8,046,097 B2 | 10/2011 | Hull et al. | |
| 8,155,775 B2 | 4/2012 | Batchelder | |
| 8,459,280 B2 | 6/2013 | Swanson et al. | |
| 8,470,234 B2 | 6/2013 | Clark | |
| 8,505,560 B2 | 8/2013 | Tafoya | |
| 8,506,836 B2 | 8/2013 | Szuromi et al. | |
| 8,684,069 B2 | 4/2014 | Mottin et al. | |
| 8,865,047 B2 | 10/2014 | Sella | |
| 9,109,979 B2 | 8/2015 | Dietrich et al. | |
| 9,183,325 B2 | 11/2015 | Wighton et al. | |
| 9,188,341 B2 | 11/2015 | McMasters et al. | |
| 9,469,057 B2 | 10/2016 | Johnson et al. | |
| 9,539,764 B2 | 1/2017 | Soucy et al. | |
| 9,636,869 B2 | 5/2017 | Kroll et al. | |
| 9,636,872 B2 | 5/2017 | Batchelder | |
| 9,908,288 B2 | 3/2018 | Harkness et al. | |
| 2002/0062909 A1 | 5/2002 | Jang et al. | |
| 2002/0171177 A1 | 11/2002 | Kritchman et al. | |
| 2004/0031780 A1* | 2/2004 | Hagemeister | A61C 13/0004 219/121.85 |
| 2004/0084814 A1 | 5/2004 | Boyd et al. | |
| 2008/0175424 A1 | 7/2008 | McBagonluri et al. | |
| 2009/0202378 A1 | 8/2009 | Illston | |
| 2011/0278773 A1 | 11/2011 | Bokodi et al. | |
| 2012/0018926 A1 | 1/2012 | Mannella et al. | |
| 2012/0113439 A1 | 5/2012 | Ederer | |
| 2013/0071562 A1 | 3/2013 | Szuromi et al. | |
| 2013/0101746 A1 | 4/2013 | Keremes et al. | |
| 2013/0112366 A1 | 5/2013 | Mottin et al. | |
| 2013/0244040 A1 | 9/2013 | Oshima | |
| 2013/0312928 A1 | 11/2013 | Mercelis et al. | |
| 2013/0316084 A1 | 11/2013 | Szuromi et al. | |
| 2014/0251481 A1 | 9/2014 | Kroll et al. | |
| 2014/0252684 A1 | 9/2014 | Swanson et al. | |
| 2014/0277669 A1 | 9/2014 | Nardi et al. | |
| 2014/0300017 A1 | 10/2014 | Wighton et al. | |
| 2014/0316549 A1* | 10/2014 | Zenere | B29C 64/40 700/120 |
| 2014/0335313 A1 | 11/2014 | Chou et al. | |
| 2015/0021379 A1 | 1/2015 | Albrecht et al. | |
| 2015/0056321 A1 | 2/2015 | Zhang et al. | |
| 2015/0061190 A1 | 3/2015 | Yakubov et al. | |
| 2015/0093283 A1 | 4/2015 | Miller et al. | |
| 2015/0174695 A1 | 6/2015 | Elfstroem et al. | |
| 2015/0190971 A1 | 7/2015 | Musuvathy et al. | |
| 2015/0273631 A1 | 10/2015 | Kenney et al. | |
| 2015/0360421 A1 | 12/2015 | Burhop et al. | |
| 2016/0009039 A1 | 1/2016 | Blanchet | |
| 2016/0023272 A1* | 1/2016 | Mongillo, Jr. | B23K 15/0086 416/95 |
| 2016/0031160 A1 | 2/2016 | Din et al. | |
| 2016/0175932 A1 | 6/2016 | Dimter et al. | |
| 2016/0193791 A1* | 7/2016 | Swanson | B29C 64/40 264/408 |
| 2016/0221264 A1* | 8/2016 | Doherty | B22F 10/00 |
| 2016/0222791 A1 | 8/2016 | Rogers | |
| 2016/0229127 A1 | 8/2016 | Halliday et al. | |
| 2016/0236277 A1 | 8/2016 | Doherty et al. | |
| 2016/0238324 A1 | 8/2016 | Butcher et al. | |
| 2016/0243620 A1* | 8/2016 | Butcher | B22F 3/1055 |
| 2016/0368224 A1 | 12/2016 | Ooba et al. | |
| 2017/0120536 A1 | 5/2017 | Brunermer et al. | |
| 2017/0136539 A1 | 5/2017 | Chou et al. | |
| 2017/0203365 A1 | 7/2017 | Pays et al. | |
| 2017/0225227 A1* | 8/2017 | Volk | B29C 64/40 |
| 2017/0232511 A1 | 8/2017 | Fieldman et al. | |
| 2017/0232512 A1 | 8/2017 | Joerger | |
| 2017/0232670 A1 | 8/2017 | Joerger et al. | |
| 2017/0232671 A1 | 8/2017 | Fieldman | |
| 2017/0232672 A1 | 8/2017 | Fieldman et al. | |
| 2017/0232682 A1 | 8/2017 | Alcantara Marte et al. | |
| 2017/0232683 A1 | 8/2017 | Alcantara Marte et al. | |
| 2017/0312822 A1 | 11/2017 | Kimblad | |
| 2017/0326815 A1 | 11/2017 | Stevenson et al. | |
| 2017/0348905 A1 | 12/2017 | Fey | |
| 2018/0029306 A1 | 2/2018 | Gold et al. | |
| 2018/0086004 A1 | 3/2018 | Van Espen | |
| 2018/0111334 A1 | 4/2018 | Gold et al. | |
| 2018/0141122 A1 | 5/2018 | Fieldman et al. | |
| 2018/0326495 A1* | 11/2018 | Dreano | B33Y 10/00 |

FOREIGN PATENT DOCUMENTS

| | | | |
|---|---|---|---|
| EP | 2447046 A2 | 10/2011 | |
| EP | 3053720 A1 | 8/2016 | |
| FR | 3043577 A1 * | 5/2017 | B29C 64/40 |
| GB | 2479616 A | 10/2011 | |
| JP | 2005297573 A | 10/2005 | |
| WO | WO2010/082331 A1 | 7/2010 | |
| WO | WO2013/017144 A1 | 2/2013 | |
| WO | WO2017/076983 A1 | 5/2017 | |

OTHER PUBLICATIONS

Strano et al., A New Approach to the Design and Optimisation of Support Structures in Additive Manufacturing, The International Journal of Advanced Manufacturing Technology, vol. 66, Issue 9-12, Jun. 2013, pp. 1247-1254. https://doi.org/10.1007/s00170-012-4403-x.

Hussein, et al., Advanced Lattice Support Structures for Metal Additive Manufacturing, Journal of Materials Processing Technology, vol. 213, Issue 7, Jul. 2013, pp. 1019-1026. DOI:10.1016/j.jmatprotec.2013.01.020. http://www.academia.edu/12651425/Advances_lattice_support_structures_for_metal_additive_manufacturing.

Langelaar, Topology Optimization of 3D Self-Supporting Structures for Additive Manufacturing, Additive Manufacturing, vol. 12, Oct. 2016, pp. 60-70. (Abstract) http://dx.doi.org/10.1016/j.addma.2016.06.010.

Forderhase et al., Reducing or Eliminating Curl on Wax Parts Produced in the Sinterstation, 2000 System, pp. 94-100. (Abstract).

Carter, Jr. et al., Direct Laser Sintering of Metals, General Electric, pp. 51-59.

Jacobson et al., Practical Issues in the Application of Direct Metal Laser Sintering, High Wycombe, Buckinghamshire, UK, pp. 728-739. (Abstract Only).

Christensen et al., Distribution of Temperatures in Arc Welding, British Welding Journal, vol. 12, Issue 12, 1965, pp. 54-75.

Mani et al., Measurement Science Needs for Real-time Control of Additive Manufacturing Powder Bed Fusion Processes, NISTIR 8036, National Institute of Standards and Technology, Feb. 2015, pp. 1-46.

Nunes, An Extended Rosenthal Weld Model, Welding Journal, vol. 62, No. 6, Jun. 1983, pp. 165-170.

Rosenthal, The Theory of Moving Sources of Heat and its Application to Metal Treatments, Transactions of American Society of Mechanical Engineers, vol. 68, Nov. 1946, pp. 849-866.

Rybicki et al., A Finite-Element Model for Residual Stresses and Deflections in Girth-Butt Welded Pipes, Journal of Pressure Vessel Technology, vol. 100, Issue 3, Aug. 1, 1978, pp. 256-262. (Abstract).

Xiong et al., Bead Geometry Prediction for Robotic GMAW-based Rapid Manufacturing Through a Neural Network and a Second-Order Regression Analysis, Journal of Intelligent Manufacturing, vol. 25, Issue 1, Feb. 2014, pp. 157-163.

U.S. Appl. No. 15/418,999, filed Jan. 30, 2017.

(56) References Cited

OTHER PUBLICATIONS

International Search Report Corresponding to Application No. PCT/US2019/038885 dated Sep. 12, 2019.
International Search Authority Written Opinion Corresponding to Application No. PCT/US2019/038885 dated Sep. 12, 2019.

* cited by examiner

ADDITIVELY MANUFACTURED BUILD ASSEMBLIES HAVING REDUCED DISTORTION AND RESIDUAL STRESS

FIELD

The present subject matter relates generally to additively manufactured build assemblies and methods of manufacturing the same to have reduced distortion and residual stress.

BACKGROUND

Additive manufacturing (AM) processes generally involve the buildup of one or more materials to make a net or near net shape (NNS) object, in contrast to subtractive manufacturing methods. For example, during a particular type of AM process referred to as direct metal laser sintering (DMLS) or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

However, conventional additive manufacturing techniques can result in distortion and/or residual stress in built components. In this regard, as the component is built up layer-by-layer, the top layer of additive powder is fused with the layer below. As the top layer of metal cools and solidifies on the layer below, it contracts and generates shear forces between the layers. Thus, the localized heating and cooling of additive material can induce stresses in the finished component, and may even result in component distortion, crack development, fractures, etc. Although various post-processing techniques may be used to mitigate the effects of such stress, some stresses are nonetheless unavoidable.

Accordingly, a method of additively manufacturing components having reduced residual stress would be useful. More specifically, an additive manufacturing process or component that exhibits reduced residual stress and distortion and requires less post-processing would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, an additively manufactured build assembly is provided including a first component and a second component spaced apart from the first component. A support structure couples the first component and the second component to fix the relative position of the first component and the second component.

In another exemplary aspect of the present disclosure, a method of manufacturing a build assembly is provided. The method includes depositing a layer of additive material on a bed of an additive manufacturing machine and selectively directing energy from an energy source onto the layer of additive material to fuse a portion of the additive material and form the build assembly. The build assembly includes a first component, a second component spaced apart from the first component, and a support structure coupling the first component and the second component to fix the relative position of the first component and the second component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
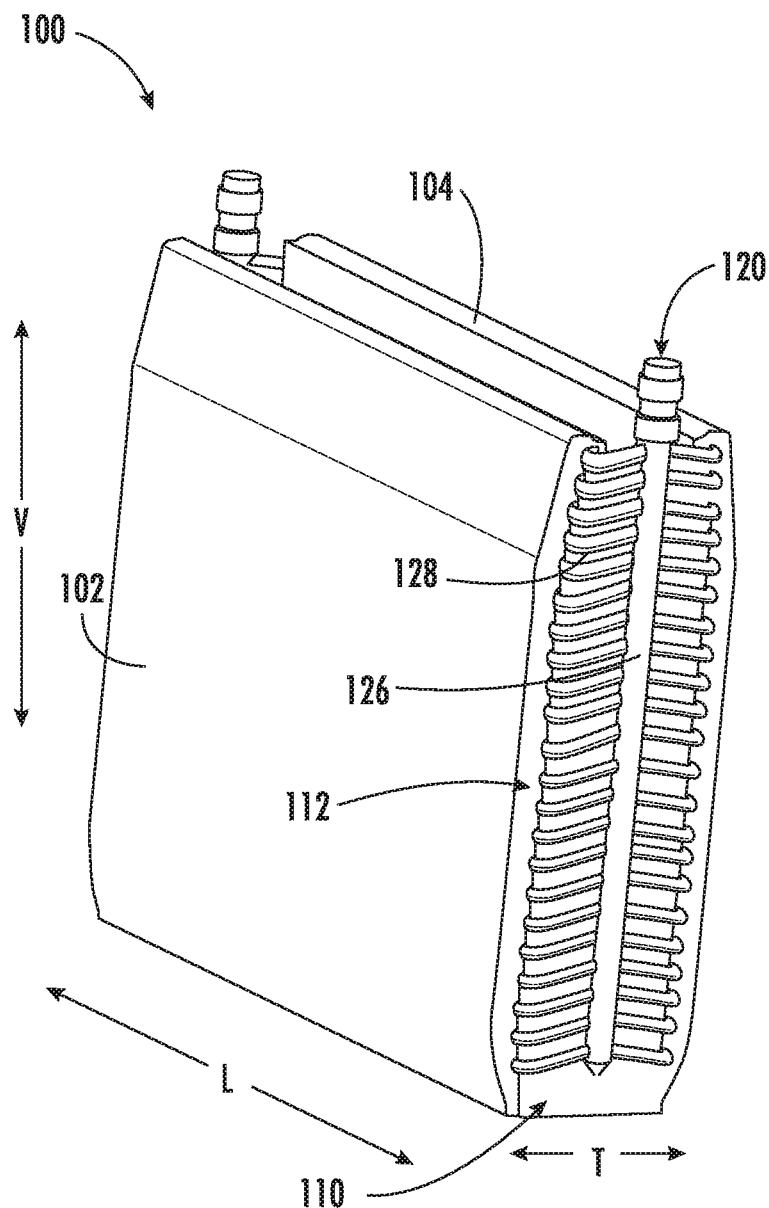
FIG. 1 is a perspective view of an additively manufactured build assembly according to an exemplary embodiment of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. In addition, as used herein, terms of approximation, such as "approximately," "substantially," or "about," refer to being within a ten percent margin of error.

The present disclosure is generally directed to a build assembly and a method of manufacturing the same. The build assembly includes a first component, a second component, and a support structure coupling the two components together to fix their relative position. The support structure may be a "ghost" structure that is not connected with or does not contact the components, but is positioned such that the components are restrained to prevent distortion. The support structure may also be connected to the components and may define channels for removing additive powder from within or around the components. In addition, the channels may be used for measuring airflow or restrictions within internal passages of the first and/or second component.

Figure 2:
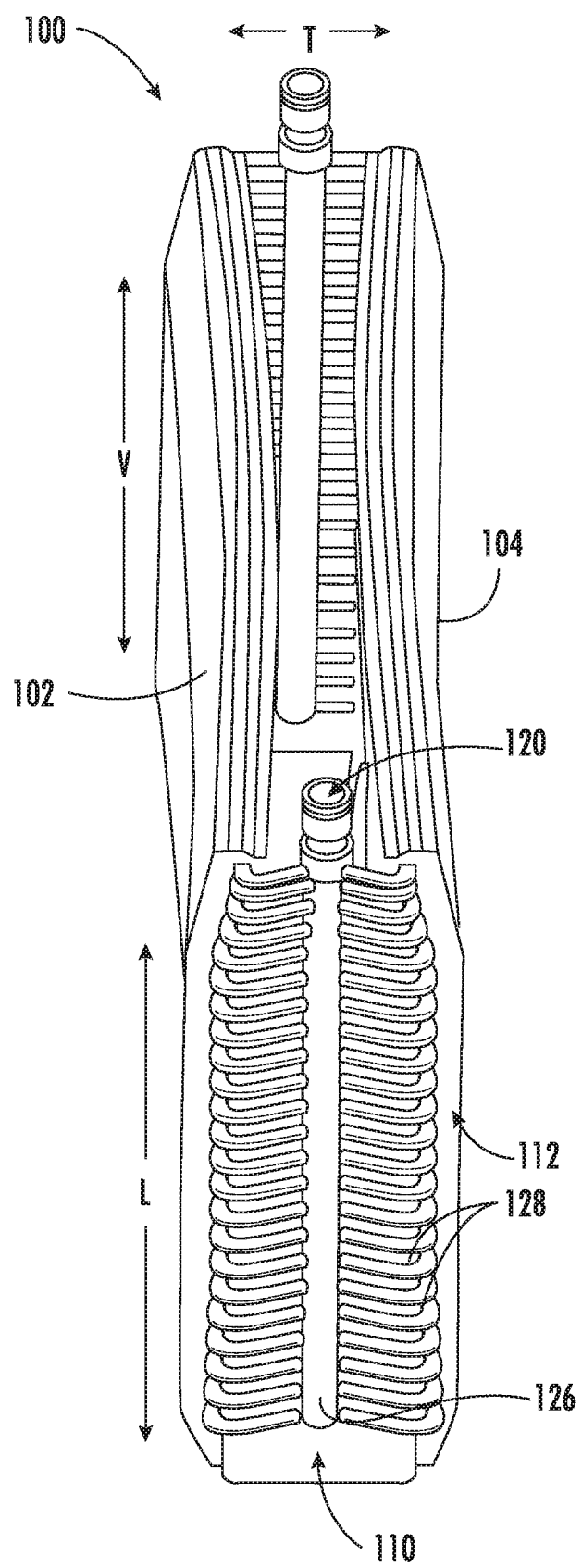
FIG. 2 is another perspective view of the exemplary build assembly of FIG. 1.
Figure 3:
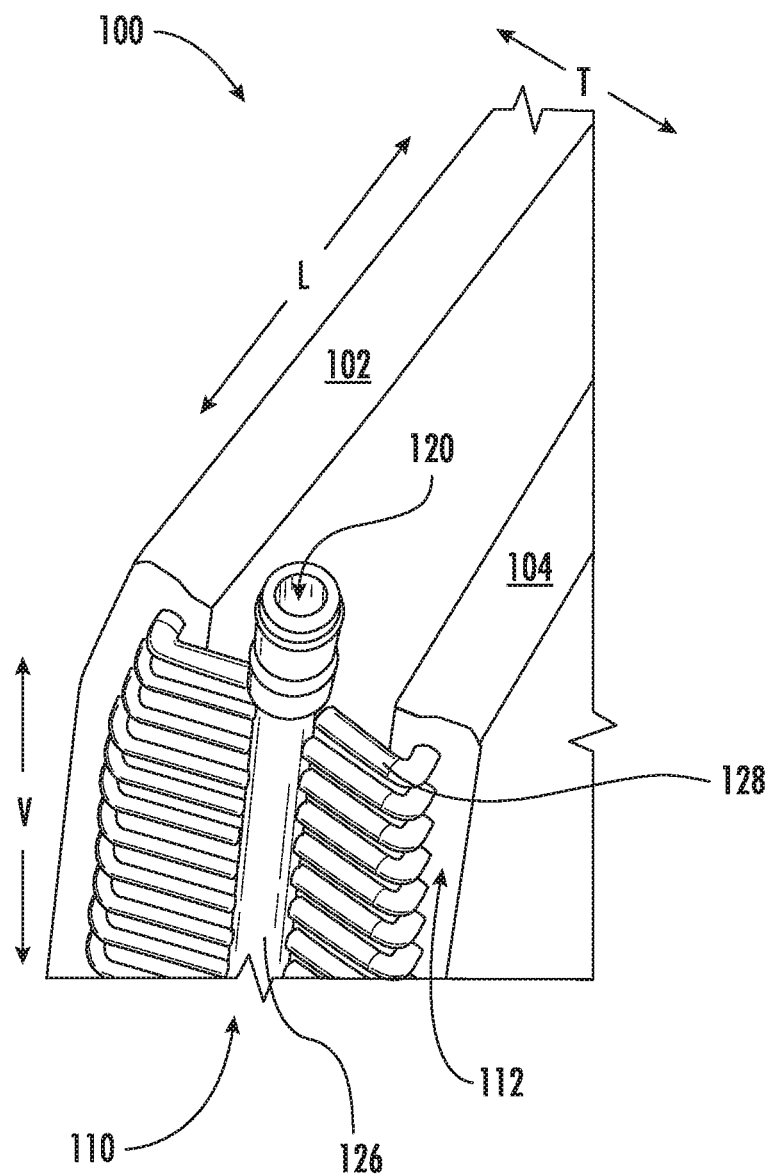
FIG. 3 is another perspective view of the exemplary build assembly of FIG. 1.
Figure 4:
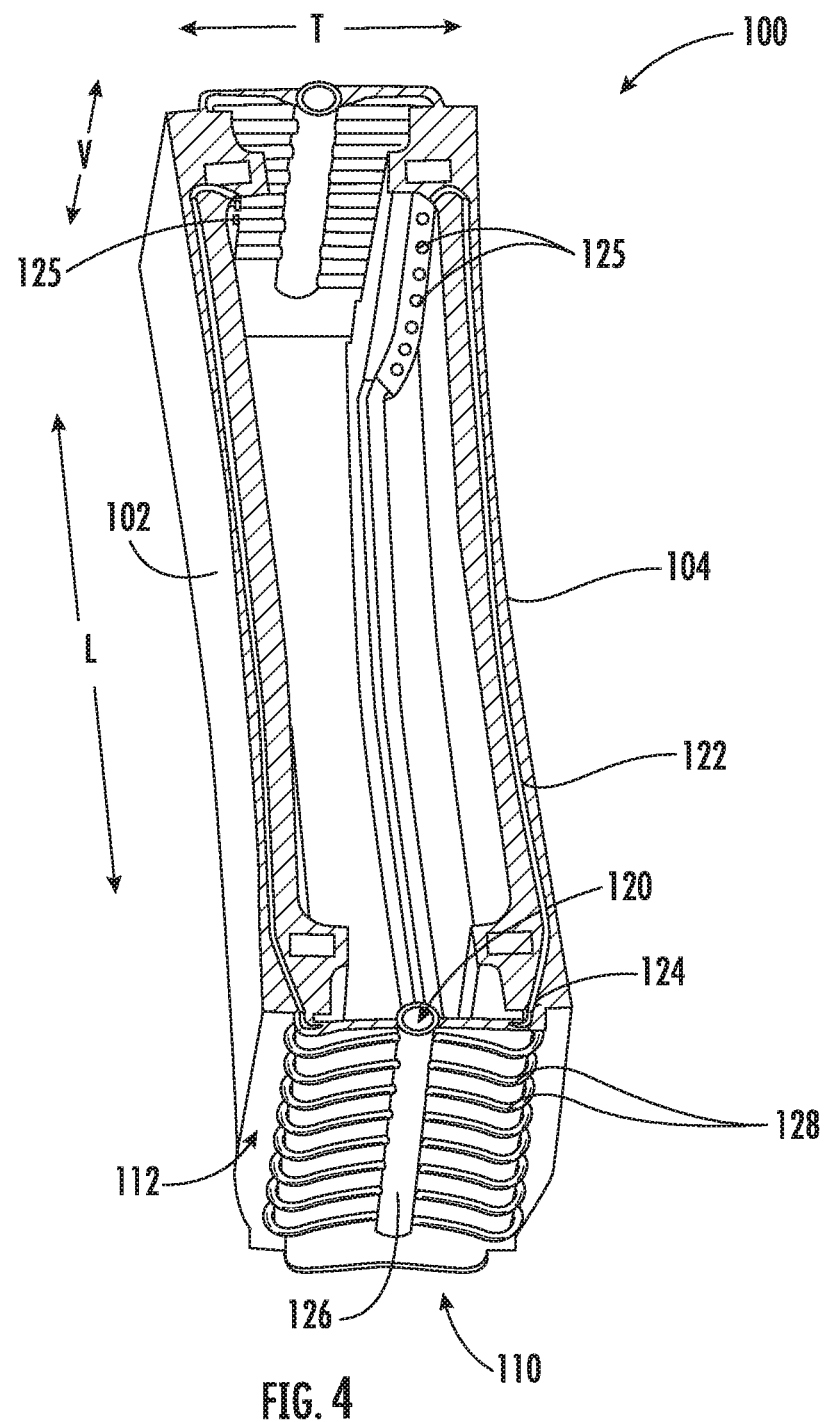
FIG. 4 is a cross sectional view of the exemplary build assembly of FIG. 1 according to an exemplary embodiment of the present subject matter.

Referring now to the drawings, FIGS. 1 through 3 are perspective views of a build assembly 100 in accordance with an exemplary embodiment of the present disclosure. According to the illustrated embodiment, build assembly 100 includes multiple distinct parts (as will be described in more detail below) that are formed simultaneously. Specifically, these parts are illustrated as two segments of a shroud of a gas turbine engine. However, it should be appreciated that build assembly 100 is described herein only for the purpose of explaining aspects of the present subject matter. In other exemplary embodiments, build assembly 100 may have any other suitable configuration. For example, it should be appreciated that in other exemplary embodiments, build assembly 100 may instead include any other number and type of components in any suitable configuration and for any suitable application.

In general, the exemplary embodiments of build assembly 100 described herein may be manufactured or formed using any suitable process. However, in accordance with several aspects of the present subject matter, build assembly 100 may be formed using an additive-manufacturing process, such as a 3-D printing process. The use of such a process may allow build assembly 100 to be formed integrally, as a single monolithic component, or as any suitable number of sub-components. In particular, the manufacturing process may allow build assembly 100 to be integrally formed and include a variety of features not possible when using prior manufacturing methods. For example, the additive manufacturing methods described herein enable the manufacture of multiple components having any suitable size and shape and stress reducing supporting structures which were not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways and part configurations. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved performance and reliability.

Referring now generally to FIGS. 1 through 5, build assembly 100 generally includes a first component 102 and a second component 104 that are spaced apart from each other, or at least not fully joined or fused together. For example, as explained briefly above, first component 102 and second component 104 may be shroud segments of a gas turbine engine. These components 102, 104 may be additively manufactured simultaneously as part of a build assembly 100, thereby reducing manufacturing time and reducing internal stresses and distortion (as described in more detail below).

Build assembly 100 generally defines a vertical direction V, a lateral direction L, and a transverse direction T, each of which is mutually perpendicular, such that an orthogonal coordinate system is generally defined. As illustrated, first component 102 and second component 104 are substantially planar components that are positioned parallel to each other within a powder bed of an additive manufacturing machine. In this regard, for example, each of first component 102 and second component 104 may define a length (e.g., measured along the lateral direction L), a height (e.g., measured along the vertical direction V), and a depth (e.g., measured along the transverse direction T). In general, the length dimension is longer than the width and the depth. In addition, according to the illustrated embodiment, the depth is the smallest dimension of each component 102, 104. As illustrated, first component 102 and/or second component 104 each define a dimensional ratio that is equal to the length divided by the depth of the respective component. According to an exemplary embodiment, the dimensional ratio of each component 102, 104 is less than 10.

According to the illustrated embodiment, build assembly 100 is constructed layer by layer using an additive manufacturing process (e.g., as described above) along the vertical direction V from a build platform of the additive manufacturing machine. However, it should be appreciated that build assembly 100 may alternatively be manufactured in any suitable build direction. In addition, although the V, L, T coordinate system is used to describe build assembly 100 herein, it should be appreciated that build assembly 100 may be defined relative to any other suitable reference frame or coordinate system. Thus, in such alternative coordinate systems, the length over depth ratio may change accordingly while remaining within the scope of the present subject matter.

As explained briefly above, the additive manufacturing process used in forming build assembly 100 may introduce residual stresses or cause distortion within the finished assembly or components. In order to prevent such distortion and stresses, it may be desirable to restrict the motion of the various components (e.g., first component 102 and second component 104) of build assembly 100 throughout the build process and/or any post processing procedures. Thus, build assembly 100 may further include a support structure 110 which extends between and couples first component 102 and second component 104 at least at one location. In this manner, support structure 110 fixes the relative position of first component 102 and second component 104 at the locations where support structure 110 is attached to the respective components.

Although various support structures 110 will be described below according to exemplary embodiments, it should be appreciated that any other suitable type or configuration of support structures may be used according to alternative embodiments. Generally speaking, "support structure" is used herein to refer to any fused portion of additive powder within the powder bed of an additive manufacturing machine which may be used to restrict, restrain, or otherwise prevent the displacement of desired portions of components of a build assembly. For example, support structure 110 may be part of build assembly 100 and may have any suitable pattern, size, thickness, or configuration suitable for preventing first component 102 and second component 104 from warping or bending during or after the build process.

According to the embodiment illustrated in FIGS. 1 through 5, build assembly 100 includes two support structures 110, each extending between lateral side surfaces 112 of first component 102 and second component 104. However, it should be appreciated that according to alternative embodiments, build assembly 100 may include any suitable number of support structures 110 extending from any suitable position(s) on first component 102 to any suitable position(s) on second component 104. In addition, support structure 110 is connected to or formed with first component 102 and second component 104, e.g., is fused directly to these components. In this manner, support structure 110 rigidly couples first component 102 and second component 104 to prevent relative motion there between.

According to the illustrated embodiment, support structure 110 is connected to first component 102 and second component 104 by directly sintering or melting the additive powder between the two structures. However, it should be appreciated that according to alternative embodiments support structure 110 may be connected to the first component 102 and second component 104 by a frangible connector (not shown). As used herein, "frangible connector" is intended to refer to a portion of support structure 110 which has a reduced strength such that it may be easily broken or snapped off after manufacturing is complete. In this regard, the frangible connector may be a region of support structure 110 that has a relatively low density or is otherwise configured for fracturing or breaking more readily than the rest of support structure 110. In this manner, frangible connectors are more easily broken for removal of support structure 110 and less post-processing is required. For example, the frangible connector may define a necked portion that is thinner than the rest of support structure 110, may be a region intentionally printed at a lower density or to include porosity, or may define a series of voids along a fracture line (e.g., similar to perforated paper).

Figure 5:
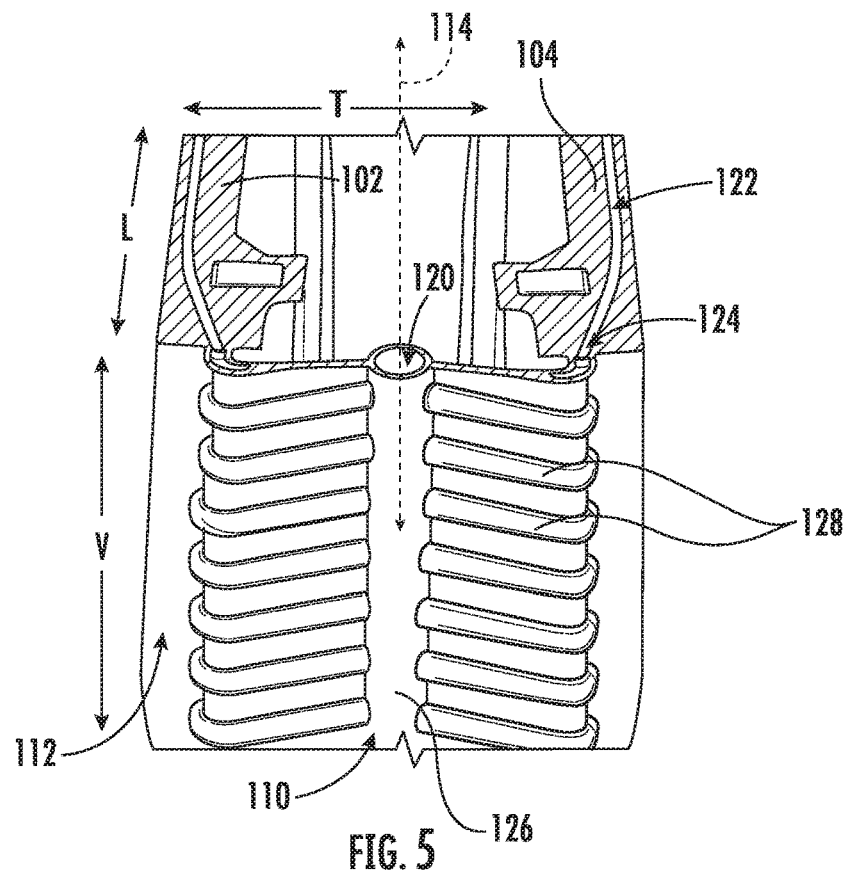
FIG. 5 is a close-up cross sectional view of the exemplary build assembly of FIG. 1 according to an exemplary embodiment of the present subject matter.

According to the illustrated embodiment, first part 102 and second part 104 are substantially identical and have a length over depth ratio of about eight (8), though other ratios are possible and within scope of the present subject matter. Indeed, as described above, aspects of the present subject matter may be used to manufacture components have any dimensional ratio less than ten (10). In addition, build assembly 100 is a substantially symmetric about a midplane 114 (e.g., as shown in FIG. 5).

Referring still to FIGS. 1 through 5, support structure 110 of build assembly 100 may further define one or more channels 120 that may be used for removing additive powder after all layers of build assembly 100 have been fused as desired. Furthermore, first component 102 and second component 104 may each define a plurality of internal passages 122 which are fluidly coupled to channels 120 of support structure 110. More specifically, first component 102 and second component 104 may define a plurality of vertically stacked inlets 124 along side surfaces 112 which are in fluid communication the internal passages 122. In addition, according to an exemplary embodiment, each internal passage 122 may terminate in an outlet 125 (FIG. 4) positioned on an opposite end of the component 102, 104 from the inlet 124.

Furthermore, channels 120 of support structure 110 may include a vertically extending central conduit 126 and a plurality of secondary conduits 128 that provide fluid communication between central conduit 126 and inlets 124. In this manner, after the build process is complete, additive powder may be vacuumed out the internal passages 122, through secondary conduits 128, and out of central conduit 126. Alternatively, a flow of pressurized air or other suitable fluid may be passed through channels 120 and internal passages 122 to blow out additive powder, the additive powder can be shaken out under the force of gravity, etc.

Although channels 120 and internal passages 122 are described above as being used for removal of additive powder after the additive manufacturing process, it should be appreciated that these features may alternatively be used to measured airflow rates through or airflow restrictions within the internal passages 122. In this regard, for example, after the additive powder is removed, a fan, source of compressed air or other fluid, or another air supply may be coupled to channels 120 to provide a flow of air through the internal passages 122. In this manner, the air supply source may detect flow restrictions within the internal passages 122 or may otherwise monitor and verify the airflow rate through internal passages 122.

Figure 6:
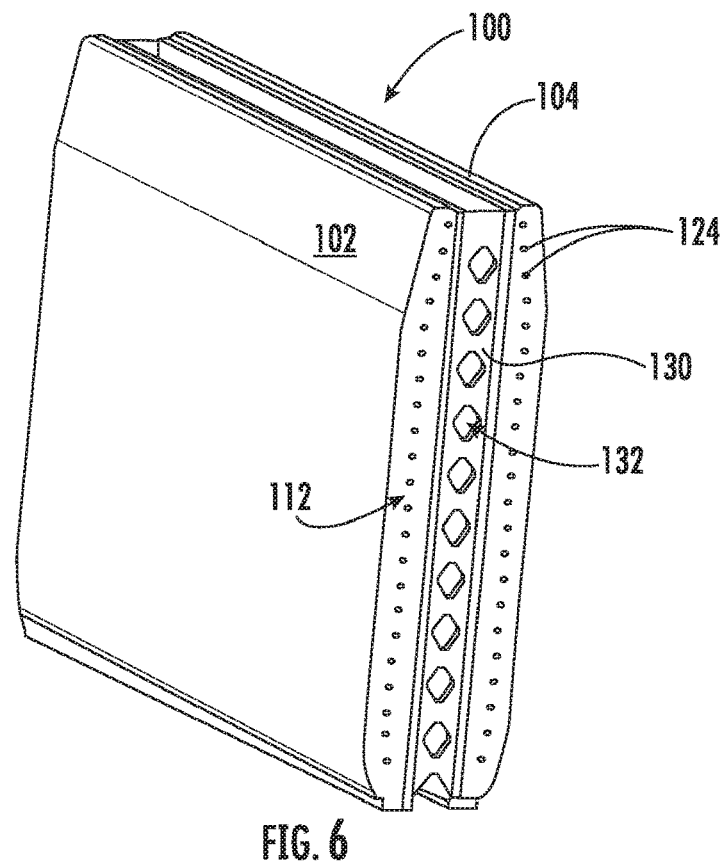
FIG. 6 is a perspective view of an additively manufactured build assembly according to another exemplary embodiment of the present subject matter.

Referring now briefly to FIG. 6, a support structure 130 may alternatively be a simple lattice structure or metal bracket that extends between side surfaces 112 the first component 102 and second component 104. The support structure 130 may define a plurality of holes 132 or may be formed to have a lower density than first component 102 and second component 104 such that it may be easily removed after the manufacturing process. In addition, the tensile and/or compressive strength of support structure 130 may be specifically designed to correspond to and counteract the forces generated by first component 102 and second component 104 during the build process.

Figure 7:
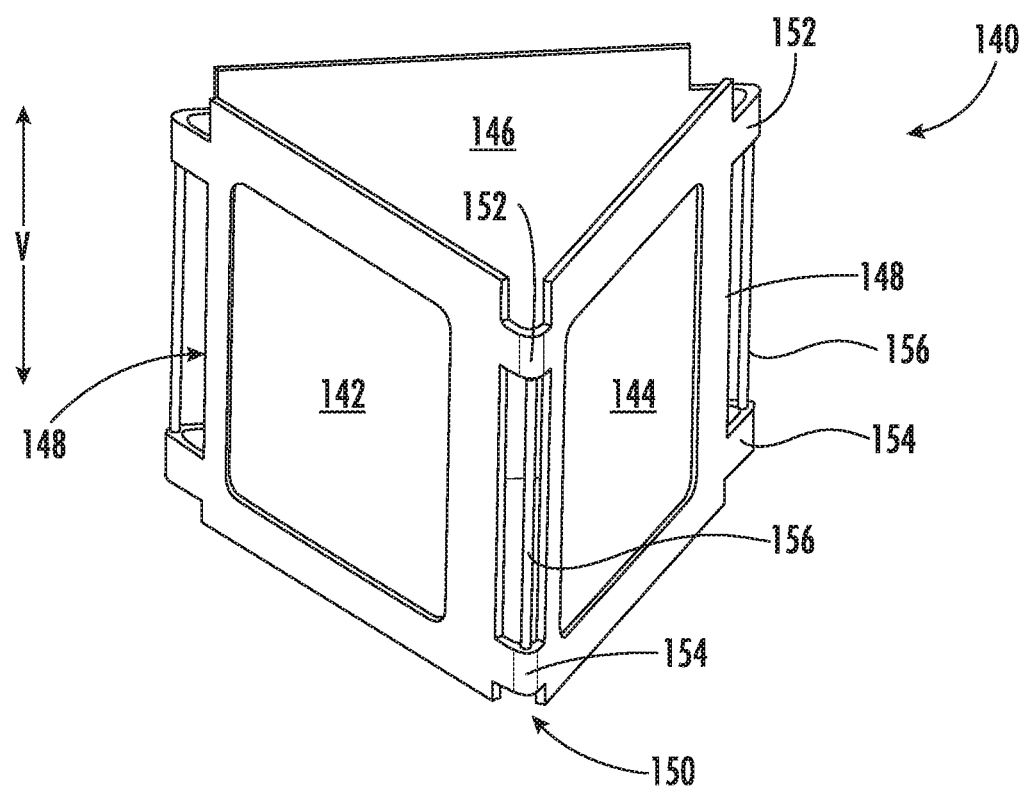
FIG. 7 is a perspective view of an additively manufactured build assembly according to another exemplary embodiment of the present subject matter.
Figure 8:
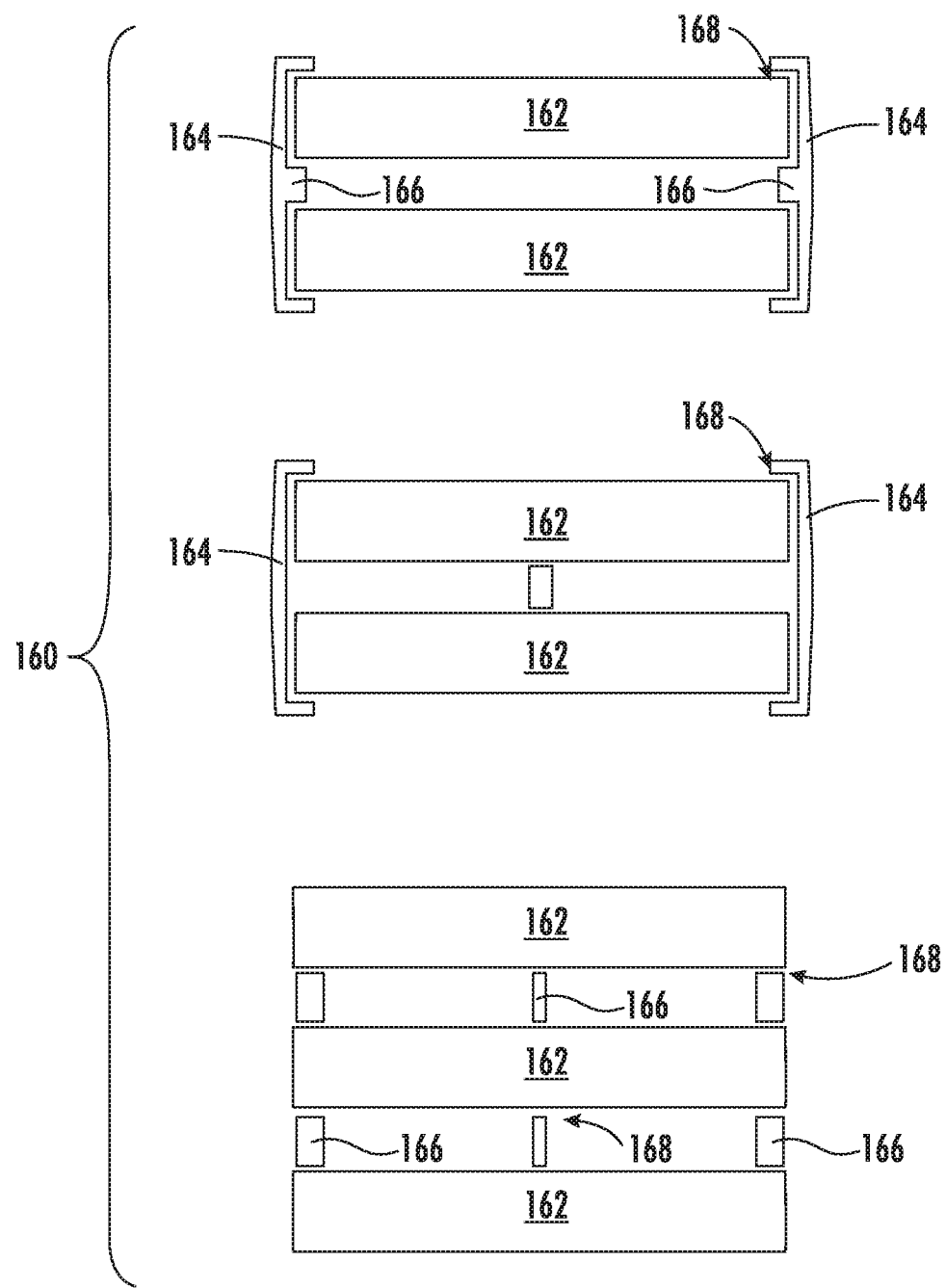
FIG. 8 is a perspective view of additively manufactured build assemblies including ghost supports according to another exemplary embodiment of the present subject matter.

According still other embodiments, build assemblies may include more than two components. For example, referring briefly to FIG. 7, a build assembly 140 is illustrated having a first component 142, a second component 144, and a third component 146. These three components are joined at their sides 148 by support structure 150 such that build assembly 140 forms an elongated triangle. Alternatively, build assembly 140 may include any suitable number of component and be formed as any polygon. In addition, each of the three support structures 150 generally includes a top corner bracket 152, a bottom corner bracket 154, and the connecting rod 156 that extends vertically between top corner bracket 152 and bottom corner bracket 154. In addition, as shown in FIG. 8, a build assembly 160 may include three or more components 162 stacked adjacent each other within a powder bed. It should be appreciated that any other suitable configuration and orientation of components within a build assembly are possible and within scope present subject matter.

According to the embodiments described above, support structure 110 is directly formed with or connected to first component 102 and second component 104 build assembly 100. However, it should be appreciated that according to alternative embodiments, support structure 110 may not be connected to first component 102 and second component 104. Referring now to FIG. 8, build assemblies will be described which use ghost supports to restrict or restrain the movement of components within the build assembly. As used herein, "ghost" supports are intended to refer to support structures which are not connected to or formed with the components of a build assembly. However, ghost supports may still be used to restrict the motion of build components.

As shown in FIG. 8, build assemblies 160 may include a plurality of components 162 positioned adjacent each other and formed simultaneously during a single manufacturing process. Build assemblies 160 may include any suitable combination of tensile supports 164 and compressive supports 166. As used herein, tensile supports 164 are used generally to refer to supports which prevent the ends of adjacent components 162 from distorting away from each other. By contrast, compressive supports 166 are positioned between components 162 to prevent them from moving closer to each other. As illustrated in FIG. 8, a small gap 168 is defined between all tensile and compressive supports 164, 166 and adjacent components 162. However, it should be appreciated that gap 168 may be as thin as one layer of unfused powder, such that virtually no movement of components 162 is possible.

In general, build assembly 100 as described herein may be additively manufactured as a single, integral piece. More specifically, using build assembly 100 as an example, first component 102, second component 104, and support structure 110 may all be integrally formed during a single manufacturing process. In addition to eliminating the need to store additional components, build assembly 100 may generally contribute to lower manufacturing costs, improved part reliability, less distortion, improved part accuracy, and less residual stress in finished components.

After the printing process is complete, build assembly 100 may be subject to various post-processing procedures. In this regard, for example, build assembly 100 may be placed into an oven for a high temperature treatment or annealing process. In addition, various surface treatments such as shot peening, machining, or polishing may be performed to create a desired surface finish. All of these procedures may be performed before or after removing support structure 110. Support structure 110 may be removed by machining or, in the case of the frangible connector, by simply snapping off support structure 110.

Now that the construction and configuration of build assembly 100 according to an exemplary embodiment of the present subject matter has been presented, an exemplary method 200 for forming a build assembly according to an exemplary embodiment of the present subject matter is provided. Method 200 can be used by a manufacturer to form build assembly 100, or any other suitable build assembly having any number, size, and configuration of components and support structures. It should be appreciated that the exemplary method 200 is discussed herein only to describe exemplary aspects of the present subject matter, and is not intended to be limiting.

Figure 9:
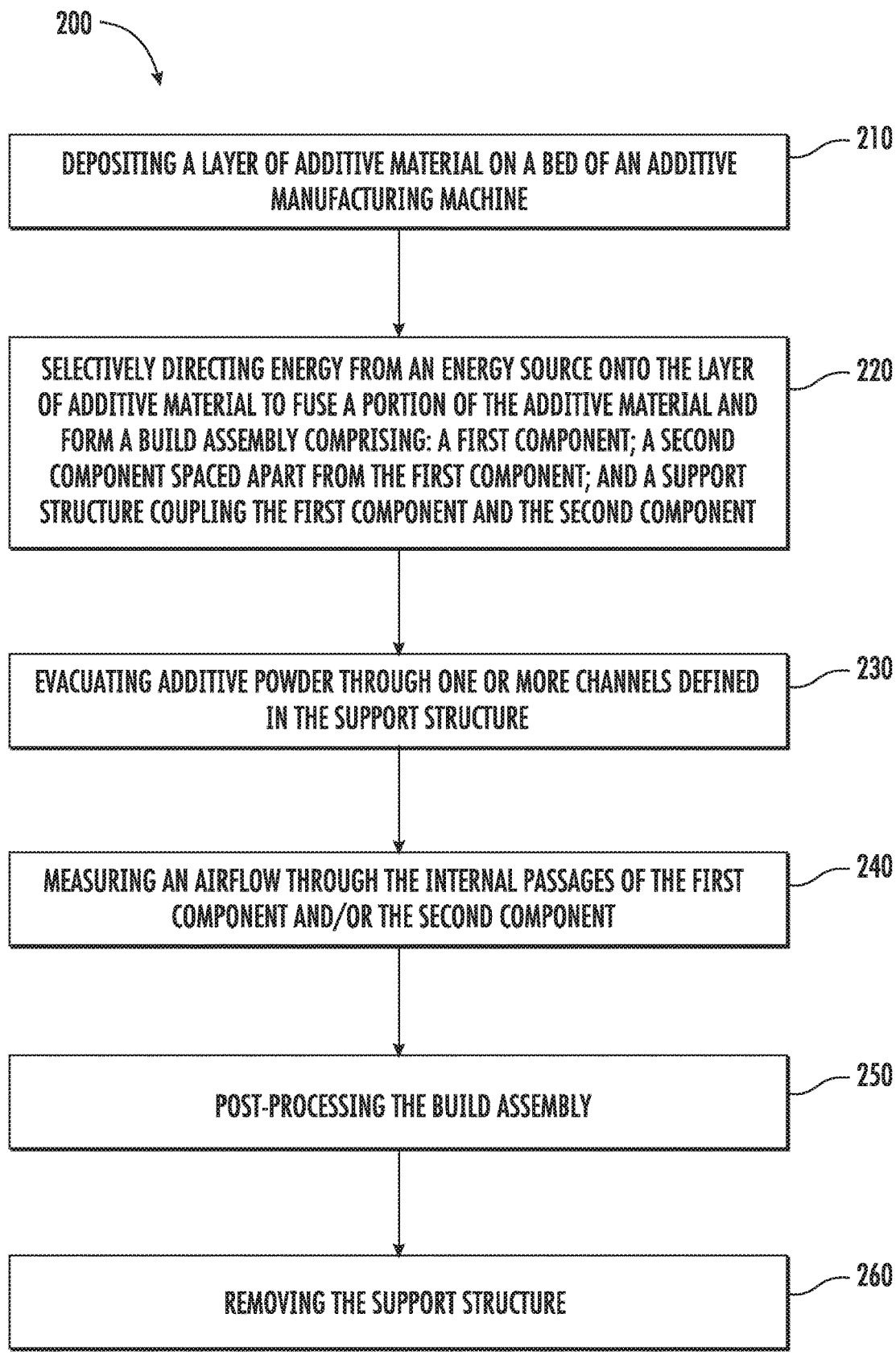
FIG. 9 is a method of manufacturing a build assembly according to an exemplary embodiment of the present subject matter.

Referring now to FIG. 9, method 200 includes, at step 210, depositing a layer of additive material on a bed of an additive manufacturing machine. Step 220 includes selectively directing energy from an energy source onto the layer of additive material to fuse a portion of the additive material and form a build assembly. Continuing the example from above, the additively manufactured build assembly may be build assembly 100. In this regard, the build assembly may include a first component, a second component spaced apart from the first component, and a support structure coupling the first component and the second component.

According to an exemplary embodiment, the build assembly may include one or more channels for removing or evacuating additive powder. Thus after the printing process is complete, method 200 includes, at step 230, evacuating additive powder through one or more channels defined in the support structure. After the additive powder is evacuated, step 240 includes measuring an airflow through internal passages of the first component and/or the second component by coupling an airflow measurement device to the one or more channels. Step 250 includes post-processing the build assembly, such as by heating in an oven, annealing, surface finishing, etc. Step 200 further includes, at step 260, removing the support structure, leaving only finished components that have not distorted during the manufacturing process, have more accurate final dimensions, and have reduced residual stress.

FIG. 9 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using build assembly 100 as an example, it should be appreciated that these methods may be applied to manufacture any suitable build assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additively manufactured build assembly for a part, the additively manufactured build assembly comprising:
   a first component of the part;
   a second component of the part spaced apart from the first component; and
   a support structure, the support structure coupled between the first component and the second component such that the support structure fixes the relative position of the first component and the second component, wherein:
   the support structure defines one or more channels;
   the first component and the second component each define a plurality of internal passages, wherein the one or more channels of the support structure are fluidly coupled to the internal passages; and
   the support structure is configured to be removed after the manufacturing process is complete.

2. The additively manufactured build assembly of claim 1, wherein:
   the support structure comprises a frangible connector, wherein:
      the frangible connector defines a portion of the support with a reduced strength as compared to a remainder of the support structure; and
      the frangible connector defines a relatively low density as compared to the remainder of the support structure, is configured to fracture or break more easily as compared to the remainder of the support structure, defines a necked portion that is thinner than the remainder of the support structure, includes an increased porosity as compared to the remainder of the support structure, defines a series of voids along a fracture line of the support structure, defines a plurality of holes, includes a lattice structure, or any combination thereof such that the frangible connector defines the reduced strength as compared to the remainder of the support structure.

3. The additively manufactured build assembly of claim 1, wherein the support structure is connected to the first component and the second component.

4. The additively manufactured build assembly of claim 3, wherein the support structure is connected to the first component and the second component by a frangible connector.

5. The additively manufactured build assembly of claim 1, wherein the first component and the second component are substantially identical and the build assembly is substantially symmetric about a midplane.

6. The additively manufactured build assembly of claim 1, further comprising a third component and second and third support structures, the first, second, and third components each being joined to the other two of the first, second, or third components by two of the support structure, the second support structure, or the third support structure such that the build assembly forms a polygon.

7. The additively manufactured build assembly of claim 1, wherein at least one of the first component and the second component defines a dimensional ratio equal to a length divided by a depth of the first component or the second component, wherein the dimensional ratio is less than 10.

8. The additively manufactured build assembly of claim 1, wherein the build assembly is post-processed prior to removing the support structure.

9. The additively manufactured build assembly of claim 1, wherein the first component, the second component, and the support structure are manufactured using at least one of selective laser sintering, selective laser melting, electron beam melting, or binder jetting.

10. The additively manufactured build assembly of claim 1, wherein the first component, the second component, and the support structure are additively manufactured as a single monolithic component.

11. The additively manufactured build assembly of claim 1, wherein the build assembly comprises a plurality of layers formed by:
    depositing a layer of additive material on a bed of an additive manufacturing machine; and
    selectively directing energy from an energy source onto the layer of additive material to fuse a portion of the additive material.

12. A method of manufacturing a build assembly of a part, the method comprising:
    depositing a layer of additive material on a bed of an additive manufacturing machine;
    selectively directing energy from an energy source onto the layer of additive material to fuse a portion of the additive material and form the build assembly, the build assembly comprising:
       a first component of the part;
       a second component of the part spaced apart from the first component; and
       a support structure, the support structure coupled between the first component and the second component such that the support structure fixes the relative position of the first component and the second component, wherein;
       the support structure defines one or more channels; and
       the first component and the second component each define a plurality of internal passages, wherein the one or more channels of the support structure are fluidly coupled to the internal passages; and
    removing the support structure.

13. The method of claim 12, wherein:
    the support structure comprises a frangible connector, wherein:
       the frangible connector defines a portion of the support with a reduced strength as compared to a remainder of the support structure; and
       the frangible connector defines a relatively low density as compared to the remainder of the support structure, is configured to fracture or break more easily as compared to the remainder of the support structure, defines a necked portion that is thinner than the remainder of the support structure, includes an increased porosity as compared to the remainder of the support structure, defines a series of voids along a fracture line of the support structure, defines a plurality of holes, includes a lattice structure, or any combination thereof such that the frangible connector defines the reduced strength as compared to the remainder of the support structure.

14. The method of claim 12, further comprising:
    removing additive powder through the one or more channels after the build assembly is completed.

15. The method of claim 12, further comprising:
  measuring an airflow through the internal passages of the first component and the second component by coupling an airflow measurement device to the one or more channels;
  post-processing the build assembly; and
  removing the support structure.

16. The method of claim 12, wherein the first component, the second component, and the support structure are additively manufactured as a single monolithic component.

* * * * *